UNITED STATES PATENT OFFICE.

OTTOKAR SERPEK, OF PARIS, FRANCE, ASSIGNOR TO SOCIÉTÉ-GENERALE DES NITRURES, OF PARIS, FRANCE.

RECOVERING PURE ALUMINA.

13,509. Specification of Reissued Letters Patent. Reissued Jan. 7, 1913.

No Drawing. Original No. 1,007,495, dated October 31, 1911, Serial No. 623,250. Application for reissue filed August 13, 1912. Serial No. 714,915.

*To all whom it may concern:*

Be it known that I, OTTOKAR SERPEK, a subject of the Emperor of Austria-Hungary, residing at 12 Rue Roquepine, city of Paris, Department of Seine, France, chemical engineer, have invented certain new and useful Improvements in Recovering Pure Alumina, of which the following is a full, clear, and exact description.

This invention relates to a process for the manufacture of pure alumina by means of aluminium nitrid, by utilizing the well-known phenomenon of auto-precipitation of alumina dissolved in a lye of aluminate of soda and already applied in the Bayer process to which reference is made hereafter.

The process which forms the subject of the present invention consists in attacking aluminium nitrid at boiling temperature and without pressure or under a very slight pressure above atmosphere, by means of a lye of aluminate of soda concentrated to 20–21° Baumé with a molecular relation of $Na_2O/Al_2O_3=4$ to 5/1; this lye contains a certain amount of free soda. The aluminium nitrid so attacked is decomposed into alumina which dissolves in the liquor and ammonia which is evolved and may be collected. After this action the liquor which is about 25° Baumé is subjected to a slight agitation with a small quantity of hydrated alumina, a part of the contained alumina precipitates spontaneously and the remaining liquor is thereby brought to a concentration of 20–21° Baumé. Consequently it may serve immediately for the attack of a fresh quantity of aluminium nitrid, as above indicated.

In the Bayer process generally employed for obtaining pure alumina, upon which the present invention is an improvement, bauxite is attacked directly by a lye of sodium aluminate concentrated to about 41° Baumé with a molecular relation $Na_2O/Al_2O_3=5$ to 6/1, and at a temperature of 150° C. corresponding to a pressure of 6 to 8 kilograms per square centimeter. After this action the liquor has to be diluted to about 25° Baumé before subjection to auto-precipitation. On the other hand after the auto-precipitation the liquor, of 20–21° Baumé, must be concentrated to 41 in order to be capable of attacking fresh quantities of bauxite.

The process which forms the subject of the present invention presents, therefore, the advantage as compared with the Bayer process, of not requiring dilution of the liquors being operated upon before auto-precipitation, nor their concentration after the latter for attacking the nitrid; moreover, the operation takes place without needing high pressures or temperatures. Further the impurities contained in the nitrid are eliminated much more easily than those in bauxite. The iron exists in the former in the reduced state, that is in a completely insoluble form yielding heavy residues which may be separated from the lye by simple decantation. The nitrid contains very little silica, and this is hardly or not at all soluble in weak lyes of aluminate. Finally the ammonia which is evolved following the decomposition of the aluminium nitrid may be readily recovered.

Example: 100 kilograms of aluminium nitrid containing 19% of nitrogen, are attacked at boiling point without pressure by a lye of sodium aluminate containing 41.4 of alumina to 108.5 of soda ($Na_2/Al_2O_3=4.32$), that is to say such as leaves the decomposers in the Bayer process. At the end of the operation, the liquor contains 84.6 of alumina to 120.9 of soda ($Na_2O/Al_2O_3=2.36$); it is, therefore, quite ready for auto-precipitation. During the attack, at the end of five and a half hours 94.3% of the contained nitrogen is evolved in the form of ammonia, and at the end of seven hours 97.7% is evolved.

I claim—

1. The process of recovering pure alumina, which consists in attacking aluminium nitrid at approximately boiling temperature by a solution of caustic soda containing aluminate, and then separating the solution from the insolubles therein and precipitating alumina by agitating the solution in the presence of aluminium hydrate.

2. The process of recovering pure alumina, which consists in attacking aluminium nitrid at approximately boiling temperature at substantially atmospheric pressure by a solution of caustic soda containing aluminate at approximately 20° Baumé, then separating the solution from the insolubles therein and then precipitating the alumina, substantially as described.

3. The process of recovering pure alumina which consists in attacking aluminium nitrid at approximately boiling temperature at substantially atmospheric pressure by a solution of caustic soda containing aluminate at approximately 20° Baumé, then precipitating the alumina, and separating the liquor from the precipitate, and then attacking a fresh quantity of aluminium nitrid by said liquor in a cyclic process.

In testimony whereof I have signed my name to this specification, in the presence of two subscribing witnesses.

OTTOKAR SERPEK.

Witnesses:
CHARLES DONN,
EUGENE LEGRIS.